(12) United States Patent
Rieger et al.

(10) Patent No.: US 11,362,823 B2
(45) Date of Patent: Jun. 14, 2022

(54) CRYPTOGRAPHIC DEVICE

(71) Applicant: Infineon Technologies AG, Neubiberg (DE)

(72) Inventors: Viola Rieger, Munich (DE); Alexander Zeh, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/947,725

(22) Filed: Aug. 13, 2020

(65) Prior Publication Data

US 2021/0067336 A1    Mar. 4, 2021

(30) Foreign Application Priority Data

Aug. 26, 2019 (DE) .......................... 102019122806.9

(51) Int. Cl.
*H04L 29/06* (2006.01)
*H04L 9/16* (2006.01)
*H04L 9/08* (2006.01)

(52) U.S. Cl.
CPC .............. *H04L 9/16* (2013.01); *H04L 9/0825* (2013.01); *H04L 9/0877* (2013.01)

(58) Field of Classification Search
CPC ........ H04L 9/16; H04L 9/0825; H04L 9/0877
See application file for complete search history.

(56) References Cited

U.S. PATENT DOCUMENTS

| | | | |
|---|---|---|---|
| 4,694,491 A | 9/1987 | Horne et al. | |
| 8,345,876 B1* | 1/2013 | Sinn ..................... | H04L 9/0656 380/255 |
| 9,087,212 B2 | 7/2015 | Balakrishnan et al. | |
| 9,626,359 B1* | 4/2017 | Sun ......................... | G06F 40/40 |
| 9,674,162 B1* | 6/2017 | Miller ................. | G06F 12/1408 |
| 2004/0049688 A1* | 3/2004 | Candelore ...... | H04N 21/440281 713/191 |
| 2007/0058634 A1* | 3/2007 | Gupta ..................... | H04L 67/12 370/392 |
| 2007/0064934 A1* | 3/2007 | Batcher ................. | H04L 9/3242 380/44 |
| 2007/0124811 A1 | 5/2007 | Dellow et al. | |
| 2008/0181399 A1* | 7/2008 | Weise ................... | H04L 9/0877 380/44 |
| 2014/0164793 A1* | 6/2014 | Hadley ................... | G06F 21/72 713/193 |
| 2018/0006812 A1 | 1/2018 | Oberheide et al. | |
| 2019/0012488 A1* | 1/2019 | Wang ...................... | G06F 21/78 |
| 2019/0205049 A1* | 7/2019 | Shan ....................... | G06F 21/78 |
| 2020/0288009 A1* | 9/2020 | Hennessy ............... | H04M 1/04 |

* cited by examiner

*Primary Examiner* — Thaddeus J Plecha
(74) *Attorney, Agent, or Firm* — Harrity & Harrity, LLP

(57) ABSTRACT

A device is provided comprising a first memory for storing a first key, a second memory for storing a second key, the device being capable of conducting a first cryptographic algorithm, wherein the first cryptographic algorithm uses the first key, the device being capable of conducting a second cryptographic algorithm, wherein the second cryptographic algorithm uses the second key, and a selection unit, which is programmable to use either the first cryptographic algorithm or the second cryptographic algorithm. Also, a method for operating such device is provided.

20 Claims, 1 Drawing Sheet

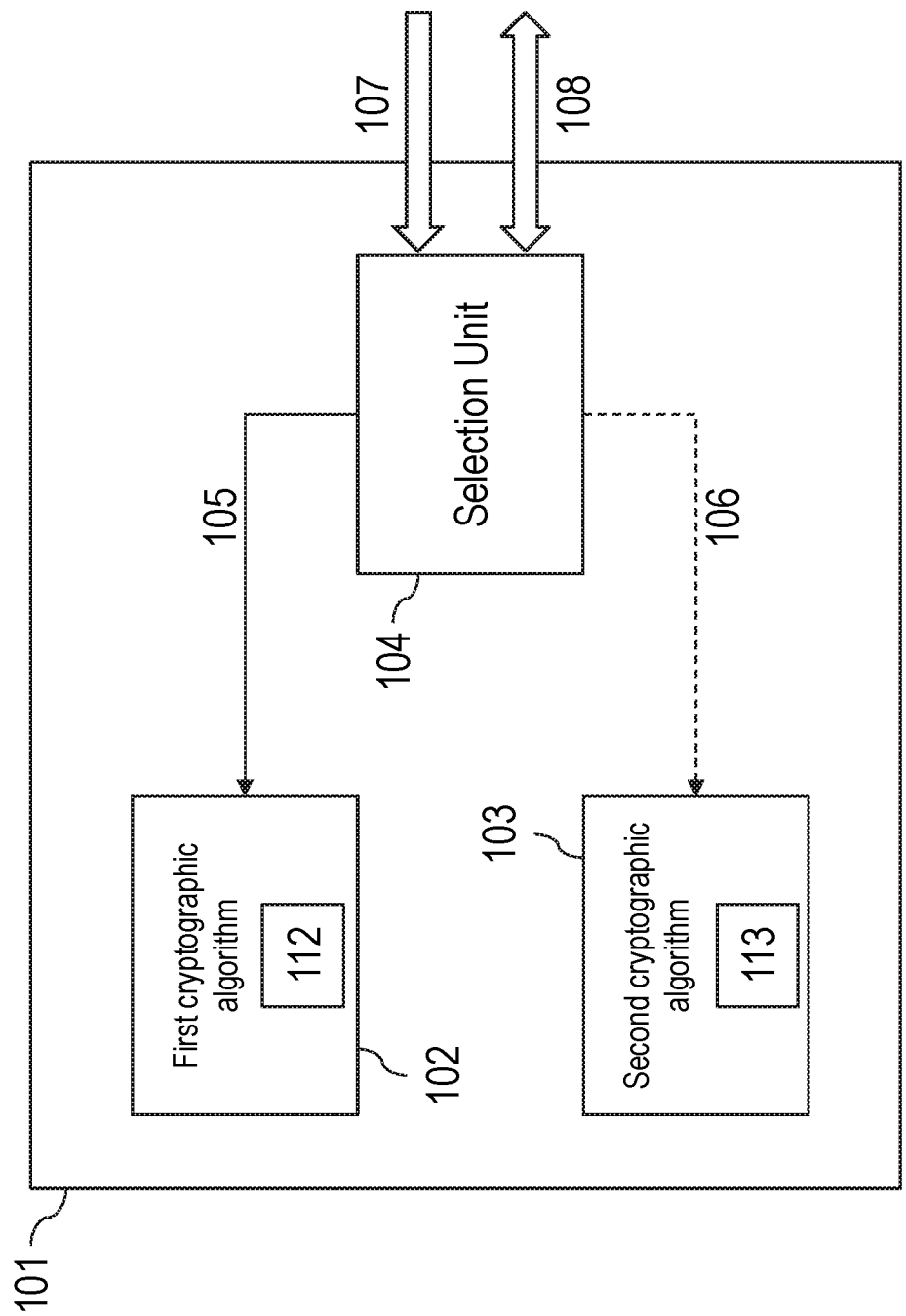

CRYPTOGRAPHIC DEVICE

CROSS REFERENCE TO RELATED APPLICATION

This application claims priority to German Patent Application No. 102019122806.9 filed on Aug. 26, 2019, the content of which is incorporated by reference herein in its entirety.

TECHNICAL FIELD

In various applications, securing communication traffic as well as securing stored information may performed.

For example, partially or fully autonomous driving applications and other use-case scenarios utilizing information via digital networking increase the basic need for data integrity, confidentiality and authenticity.

Known cryptographic approaches are, e.g., Public Key Cryptography (PKC), Symmetric Key Cryptography (SKC) and/or Hashing Algorithms (HA).

PKC, SKC and HA may be realized in hardware, software or combinations of both. Oftentimes, software solutions may be cheaper with respect to cost per device, wherein hardware implementations may be advantageous with regard to throughput, latency, power efficiency and attack resistance.

Various standards are known to define cryptographic algorithms, e.g., ECDHE-ECDSA, AES or SHA, which may be used by secured communication protocols like TLS, IPSec or MACSec. Cryptographic algorithms may also be used for Secure Onboard Communication specified by AUTOSAR (AUTomotive Open System ARchitecture) or IoT (Internet of Things) protocols like Zigbee. Further, the Japan Automotive Software Platform and Architecture (JASPAR) thrives for a solution of its own and the Chinese Encryption Law prescribes a set of proprietary cryptographic algorithms like SM2, SM4 and SM3.

Implementations that can efficiently adjust to different use-case scenarios is described herein.

The examples suggested herein may in particular be based on at least one of the following implementations. Combinations of the following features may also be utilized. The features of the method could be combined with any feature (s) of the device, apparatus or system or vice versa.

A device is suggested comprising
a first memory for storing a first key,
a second memory for storing a second key,
the device being capable of conducting a first cryptographic algorithm, wherein the first cryptographic algorithm uses the first key,
the device being capable of conducting a second cryptographic algorithm, wherein the second cryptographic algorithm uses the second key,
a selection unit, which is programmable to use either the first cryptographic algorithm or the second cryptographic algorithm.

Hence, the implementation(s) presented in particular allows selecting one of the cryptographic algorithms. This may exemplarily be done in an exclusive manner. Based on particular requirements, the device may thus ensure that only one particular cryptographic algorithm is used at a time.

The device may be a "secure" device that is subject to certain security requirements and may, e.g., comprise a "secure" memory. The device may in particular be or comprise a hardware security module (HSM).

The device may be used in an automotive environment, e.g., in a vehicle or car.

It is noted that there may be more than two cryptographic algorithms, wherein the selection unit exclusively selects (enables) one of them and de-selects (disables) the remaining cryptographic algorithm(s). Selecting a cryptographic algorithm means that it can be used for operation, wherein a de-selected cryptographic algorithm cannot be used for operation. The selection may be permanent or it may be subject to re-configuration.

According to an implementation, the first cryptographic algorithm is a cryptographic algorithm of a first set of cryptographic algorithms and the second cryptographic algorithm is a cryptographic algorithm of a second set of cryptographic algorithms, wherein the selection unit is programmable to use either the first set of cryptographic algorithms or the second set of cryptographic algorithms.

Hence, the first set of cryptographic algorithms may comprise at least one cryptographic algorithm and the second set of cryptographic algorithms may also comprise at least one cryptographic algorithm. There may be more than two sets present. The selection unit exclusively selects (enables) one set and de-selects (disables) the other set(s) of cryptographic algorithms. At a time, only one set of cryptographic algorithms is enabled and can be used.

According to an implementation, the first memory and the second memory are part of one common physical memory or they are part of different physical memories.

Each memory mentioned herein may be subject to certain security requirements. The memories may at least partially be "secured" memories which are hardened against attacks.

According to an implementation, the first key is a first secret key as part of a first key pair, wherein the first key pair comprises a first public key to be used for public key cryptography.

According to an implementation, the second key is a second secret key as part of a first key pair, wherein the second key pair comprises a second public key to be used for public key cryptography.

According to an implementation, the first secret key and the second secret key are only used for processing purposes within the device and are not conveyed outside of the device.

According to an implementation, the first memory and the second memory are part of a hardware security module of the device.

According to an implementation, the device is a microcontroller unit or it comprises a microcontroller unit.

According to an implementation, the first cryptographic algorithm and the second cryptographic algorithm are implemented as hardware and/or software portions and they are part of the device.

According to an implementation, the first cryptographic algorithm and the second cryptographic algorithm each is one of the following type:
an algorithm for public key cryptography;
an algorithm for symmetric cryptography;
a hash algorithm.

According to an implementation, the first cryptographic algorithm and the second cryptographic algorithm are of the same type or they are of different types.

According to an implementation, the selection unit is arranged to select either the first cryptographic algorithm or the second cryptographic algorithm based on a message or command received.

The message or command may be conveyed towards the device, e.g. the selection unit of the device. The message or command may be any information that can be used for configuration purposes, e.g. for setting the selection unit.

It is noted that the selection unit may be a functional entity of the device. It may be realized in hardware and/or software. It can be subject to certain security requirements. According to an implementation, the message or command is protected by at least one security mechanism, in particular an authentication and/or an encryption.

It is noted that such protection ensures that the selection of the cryptographic algorithm cannot easily be changed.

According to an implementation, the message or command enables using one of the first cryptographic algorithm or the second cryptographic algorithm and disables using the respective other one.

Hence, it can be ensured that during runtime or normal operation, only one cryptographic algorithm is available and functional.

According to an implementation, the selection unit is arranged to allow selecting either the first cryptographic algorithm or the second cryptographic algorithm for a predefined number of times, in particular only once.

Also, a vehicle is suggested comprising and operating at least one of the devices as described herein.

Further, a method is provided for operating a cryptographic device,
  wherein the cryptographic device comprises
    a first memory for storing a first key,
    a second memory for storing a second key,
    the device being capable of conducting a first cryptographic algorithm, wherein the first cryptographic algorithm uses the first key,
    the device being capable of conducting a second cryptographic algorithm, wherein the second cryptographic algorithm uses the second key,
    a selection unit, which is programmable to use either the first cryptographic algorithm or the second cryptographic algorithm.
  wherein the method comprises:
    selecting either the first cryptographic algorithm or the second cryptographic algorithm via the selection unit.

According to an implementation, the first cryptographic algorithm or the second cryptographic algorithm is exclusively selected via the selection unit either permanently or temporarily.

Also, a computer program product is suggested, which is directly loadable into a memory of a digital processing device, comprising software code portions for performing the steps of the method as described herein.

BRIEF DESCRIPTION OF THE DRAWINGS

Implementations are shown and illustrated with reference to the drawing. The drawing serves to illustrate the basic principle, so that in particular aspects necessary for understanding the basic principle are illustrated.

FIG. 1 shows a device, in particular a cryptographic device, which is used to exclusively enable one cryptographic algorithm out of many cryptographic algorithms.

DETAILED DESCRIPTION

In an example implementation, a hardware module may support different cryptographic algorithms or different sets of cryptographic algorithms, wherein the hardware module could be arranged such that it uses only one out of the cryptographic algorithms or only one set of cryptographic algorithms.

For example, a first set SET1 of algorithms comprises
  a first public key algorithm PKC1,
  a first symmetric key algorithm SKC1, and
  a first hash algorithm HAL
and a second set SET2 of algorithms comprises
  a second public key algorithm PKC2,
  a second symmetric key algorithm SKC2, and
  a second hash algorithm HA2.

The hardware module may be arranged such that cryptographic operations are used either of the first set SET1 or of the second set SET2, but not of both sets at a time. Hence, the hardware module may comprise a selection unit that either
  activates or enables the first set SET1 of algorithms and
  deactivates or disables the second set SET2 of algorithms
or
  activates or enables the second set SET2 of algorithms and
  deactivates or disables the first set SET1 of algorithms.

The hardware module may be a hardware security module or it may comprise a hardware security module. The hardware security module is able to conduct or run the algorithms. For example, the hardware security module may comprise hardware and/or software and/or firmware that enables the security module to conduct the various cryptographic algorithms.

The hardware security module may also be referred to as security subsystem.

As indicated above, the hardware module is also arranged to select one out of many (at least two) cryptographic algorithm and to de-select or disable the remaining cryptographic algorithms or—in case there are several sets of cryptographic algorithms—to select one set out of the at least two sets of cryptographic algorithms thereby de-selecting or disabling the remaining set(s) of cryptographic algorithms.

The hardware security module may comprise at least one (e.g., secure) memory. The memory may be used to store secret information, e.g., at least one key.

Each algorithm or each set of algorithms may be associated with or have access to a dedicated memory that is used for storing the secret information for this particular algorithm or set of algorithms. The dedicated memories may be part of one physical memory or they may be distributed across several physical memories. Each memory that is used for storing secret information may be a secured or hardened memory (area) that fulfills predetermined requirements to increase the difficulty for an external attack on the secret information to be successful.

It is an option that only a selection of the algorithms of the respective set of algorithms is associated with a dedicated memory. This may in particular be applicable if an algorithm does not require a secret information or that the secrecy requirement allows using keys of lesser confidentiality.

The selection unit may be arranged in a way that allows for a single selection of one cryptographic algorithm or a single selection of one set of cryptographic algorithms. This can be achieved, e.g., via an electronic fuse that may be blown by a manufacturer or a customer. Blowing the electronic fuse is an irreversible action and thereafter the device is operational to conduct only the selected one of the cryptographic algorithms or the selected set of cryptographic algorithms. As an alternative, a trap door register can be used, allowing to lock the selection of an cryptographic algorithm for one single driving cycle.

As an alternative, the selection unit may be subject to (re-)configuration. In such case, the configuration allows exclusively selecting and using one of the cryptographic algorithms or—in case of sets of cryptographic algorithms—one set of cryptographic algorithms. However, this selection may be reversible and therefore changed (re-configured) at a later point in time. The re-configuration is preferably protected by at least one security mechanism, e.g., an authentication to preferably only allow entitled users or processes to get access and to conduct the (re-)configuration. The (re-)configuration may be realized by setting at least one register of the hardware module thereby making apparent to the hardware module which of the cryptographic algorithms (or which set of cryptographic algorithms) to use exclusively.

FIG. 1 shows a device 101, which may be a cryptographic hardware, e.g., a hardware security module, or it may comprise such hardware security module.

The device 101 comprises a first cryptographic algorithm 102 and a second cryptographic algorithm 103.

The first cryptographic algorithm 102 comprises a first memory 112 and the second cryptographic algorithm 103 comprises a second memory 113. The first memory 112 and the second memory 113 may be portions of at least one physical memory. The first memory 112 and/or the second memory 113 may be portions of at least one secure memory which is hardened against attacks.

In an example, a cryptographic key used by the first cryptographic algorithm 102 is stored in the first memory 112. Accordingly, a cryptographic key used by the second cryptographic algorithm 103 is stored in the memory 113. These cryptographic keys are examples of secrets that can be stored in the dedicated memories 112 and 113. Such secrets may be only used by the associated cryptographic algorithm and its usage may be limited to the device 101 of the respective cryptographic algorithm. In other words, the secret(s) may not leave the device 101.

A selection unit 104 is provided to exclusively enable either the first cryptographic algorithm 102 or the second cryptographic algorithm 103. If there are more than one cryptographic algorithms to be selected, the selection unit 104 is arranged to exclusively enable only one out of several cryptographic algorithms at a time; the remaining algorithms are then permanently or temporarily disabled. In FIG. 1 this is visualized by arrows 105 and 106: the arrow 105 indicates that exemplarily the first cryptographic algorithm 102 is enabled and the arrow 106 indicates that the second cryptographic algorithm 103 is disabled.

FIG. 1 thus shows an example to select one out of two cryptographic algorithms 102, 103 via the selection unit 104. However, instead of the first cryptographic algorithm 102 a set of first cryptographic algorithms may be selected and a second set of cryptographic algorithms may be de-selected instead of the single second cryptographic algorithm 103. In other words, one set out of many sets of cryptographic algorithms may be selected by the selection unit 104, wherein the selected set of cryptographic algorithms is exclusively used permanently or temporarily. Each set of cryptographic algorithms may have at least one dedicated (secure) memory as described above with regard to the memories 112, 113. FIG. 1 describes an example implementation with only one cryptographic algorithm per set. As indicated, there may at least one cryptographic algorithm per set and/or there may be more than two sets. The selection unit only selects (enables) one of the sets and de-selects (disables) the other sets. Selecting in this regard means that the at least one cryptographic algorithm of the selected set can be used while the at least one cryptographic algorithm of the de-selected set cannot be used.

The selection unit 104 may utilize various means to conduct such selection. For example, a register may indicate which cryptographic algorithm 102 or 103 to use. Likewise, the register may indicate which set of cryptographic algorithms is to be used. Such register can be set permanently or it can be subject to (re-)configuration. As an alternative, an electronic fuse can be used as selection unit, which can be blown only once thereby permanently selecting one of the cryptographic algorithms or one of the sets of cryptographic algorithms.

The selection unit 104 can be permanently set by a manufacturer or by a customer (indicated by an arrow 107). This means that one of the cryptographic algorithms 102 or 103 or sets of cryptographic algorithms will be permanently enabled while the other one is permanently disabled. For example, a predefined voltage may be applied to at least one pin of the device 101 to conduct this kind of selection.

As an alternative, the selection unit 104 can be configured to temporarily but exclusively use one of the cryptographic algorithms 102 or 103. Under the same token the selection unit 104 can be configured to temporarily but exclusively use on set of cryptographic algorithms. This may require a bilateral communication as it is indicated by an arrow 108. Hence, an interface may be provided by the device 101 for a manufacturer or customer to communicate with. It is noted that such configuration or re-configuration is preferably protected by at least one security mechanism. For example, a communication with the selection unit 104 for configuration or re-configuration purposes may be subject to an encryption itself and/or an authentication to allow only preset entities to conduct the (re-)configuration.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, e.g., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example implementations have been disclosed, it will be apparent to those skilled in the art that various changes and modifications can be made which will achieve some of the advantages of the implementations without departing from the spirit and scope of the implementations. It will be obvious to those reasonably skilled in the art that other components performing the same functions may be suitably substituted. It should be mentioned that features explained with reference to a specific FIGURE may be combined with features of other FIGURES, even in those cases in which this has not explicitly been mentioned. Further, the methods described herein may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device comprising
   a first memory for storing a first key used by a first cryptographic algorithm executed by the device,
   a second memory for storing a second key used by a second cryptographic algorithm executed by the device, and
   a selection unit configured to use only one of the first cryptographic algorithm or the second cryptographic algorithm during operation of the device.

2. The device according to claim 1, wherein the first cryptographic algorithm is a cryptographic algorithm of a first set of cryptographic algorithms and the second cryptographic algorithm is a cryptographic algorithm of a second set of cryptographic algorithms, and wherein the selection unit is programmable to use either the first set of cryptographic algorithms or the second set of cryptographic algorithms.

3. The device according to claim 1, wherein the first memory and the second memory are part of one common physical memory or are part of different physical memories.

4. The device according to claim 1, wherein the first key is a first secret key that is part of a first key pair, and wherein the first key pair comprises a first public key to be used for public key cryptography.

5. The device according to claim 4, wherein the second key is a second secret key that is part of a second key pair, and wherein the second key pair comprises a second public key to be used for public key cryptography.

6. The device according to claim 5, wherein the first secret key and the second secret key are only used for processing purposes within the device and are not conveyed outside of the device.

7. The device according to claim 1, wherein the first memory and the second memory are part of a hardware security module of the device.

8. The device according to claim 1, wherein the device is a microcontroller unit or the device comprises a microcontroller unit.

9. The device according to claim 1, wherein the first cryptographic algorithm and the second cryptographic algorithm are implemented as hardware and/or software portions and are part of the device.

10. The device according to claim 1, wherein each of the first cryptographic algorithm and the second cryptographic algorithm is an algorithm for public key cryptography, an algorithm for symmetric cryptography, or a hash algorithm.

11. The device according to claim 10, wherein the first cryptographic algorithm and the second cryptographic algorithm are of different types.

12. The device according to claim 1, wherein the selection unit is configured to select only one of the first cryptographic algorithm or the second cryptographic algorithm based on a received message or command.

13. The device according to claim 12, wherein the received message or command is protected by at least one of an authentication or an encryption.

14. The device according to claim 12, wherein the received message or command enables using a first one of the first cryptographic algorithm or the second cryptographic algorithm and disables using another one of the first cryptographic algorithm or the second cryptographic algorithm.

15. The device according to claim 1, wherein the selection unit is arranged to allow selecting either the first cryptographic algorithm or the second cryptographic algorithm for a predefined number of times.

16. A vehicle comprising and operating the device of claim 1.

17. A method for operating a device,
   wherein the device comprises:
      a selection unit configured to use only one of a first cryptographic algorithm or a second cryptographic algorithm during operation of the device,
   wherein the method comprises:
      storing a first key used by the first cryptographic algorithm executed by the device in a first memory, storing a second key used by the second cryptographic algorithm executed by the device in a second memory, selecting, by the selection unit and during operation of the device, only one of the first cryptographic algorithm or the second cryptographic algorithm.

18. The method according to claim 17, wherein the first cryptographic algorithm or the second cryptographic algorithm is exclusively selected via the selection unit either permanently or temporarily.

19. A computer program product comprising a non-transitory computer-readable medium and instructions for performing the steps of the method according to claim 17.

20. The device of claim 17, wherein the device is a cryptographic device.

* * * * *